(12) United States Patent
Dommaschk et al.

(10) Patent No.: US 8,144,489 B2
(45) Date of Patent: Mar. 27, 2012

(54) PRODUCTION OF A REAL POWER EQUILIBRIUM OF THE PHASE MODULES OF A CONVERTER

(75) Inventors: Mike Dommaschk, Guteborn (DE); Jörg Dorn, Buttenheim (DE); Ingo Euler, Erlangen (DE); Jörg Lang, Stadtsteinach (DE); Quoc-Buu Tu, Rosstal (DE); Klaus Würflinger, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 441 days.

(21) Appl. No.: 12/518,200

(22) PCT Filed: Dec. 8, 2006

(86) PCT No.: PCT/DE2006/002251
§ 371 (c)(1),
(2), (4) Date: Jul. 1, 2009

(87) PCT Pub. No.: WO2008/067788
PCT Pub. Date: Jun. 12, 2008

(65) Prior Publication Data
US 2010/0020577 A1    Jan. 28, 2010

(51) Int. Cl.
*H02M 1/12* (2006.01)
(52) U.S. Cl. .............................................. 363/39
(58) Field of Classification Search ............ 363/39, 363/40, 44, 71, 78, 88, 95, 98, 131, 56.01, 363/132; 307/105, 151; 323/205, 207; 322/20; 318/503, 801, 803, 807
See application file for complete search history.

(56) References Cited

U.S. PATENT DOCUMENTS

| | | | | |
|---|---|---|---|---|
| 5,345,375 A * | 9/1994 | Mohan | ............................. | 363/40 |
| 6,058,031 A * | 5/2000 | Lyons et al. | ..................... | 363/67 |
| 6,084,791 A * | 7/2000 | Gopfrich | ......................... | 363/98 |
| 6,967,453 B2 * | 11/2005 | Miettinen | ..................... | 318/471 |
| 7,050,311 B2 * | 5/2006 | Lai et al. | .......................... | 363/37 |
| 7,176,653 B2 * | 2/2007 | Jahkonen | ....................... | 318/807 |
| 7,248,489 B2 * | 7/2007 | Strandberg | ....................... | 363/37 |
| 7,450,405 B2 * | 11/2008 | Ponnaluri et al. | ............... | 363/40 |

(Continued)

OTHER PUBLICATIONS

Lesnicar, et al: "A New Modular Voltage Source Inverter Topology", Institute of Power Electronics and Control, XP-002454302, pp. 1-10, Oct. 10, 2007, Muenchen, Germany.

(Continued)

*Primary Examiner* — Adolf Berhane
(74) *Attorney, Agent, or Firm* — Laurence A. Greenberg; Werner H. Stemer; Ralph E. Locher

(57) ABSTRACT

A converter has at least one phase module, an AC voltage terminal and a DC voltage terminal. A phase module branch is formed between each DC voltage terminal and each AC voltage terminal. Each phase module branch has a series circuit containing submodules which each have a capacitor, a power semiconductor, and submodule sensors for detecting energy stored in the capacitor and with a regulation device for regulating the apparatus in dependence on energy values and predetermined desired values. Therefore unbalanced loading of the energy storage units is avoided. The regulation device has a summation unit for summing the energy values while obtaining branch energy actual values and a device for calculating circuit current desired values in dependence on the branch energy actual values. The regulation device compensates for imbalances in the branch energy actual values in dependence on the circuit current desired values.

18 Claims, 8 Drawing Sheets

U.S. PATENT DOCUMENTS 7,800,925 B2 * 9/2010 Eldery et al. ............... 363/40
7,960,871 B2 * 6/2011 Dommaschk et al. ........ 307/151

OTHER PUBLICATIONS

Lesnicar, et al: "An Innovative Modular Multilevel Converter Topology Suitable for a Wide Power Range", XP-002447365, Aug. 20, 2007, Muenchen, Germany.

Marquardt, et al: "New Concept for High Voltage—Modular Multilevel Converter", PESC 2004 Conference in Aachen, Germany, XP-002447362, pp. 1-6, Jun. 20-25, 2004, Muenchen, Germany.

Marquardt, et al: "Modular Converter Design for Grid Interconnection Applications at High Voltages", Universitaet der Bundeswehr, XP-002447360, Oct. 5, 2007, pp. 1-13, Muenchen, Germany.

* cited by examiner

PRODUCTION OF A REAL POWER EQUILIBRIUM OF THE PHASE MODULES OF A CONVERTER

BACKGROUND OF THE INVENTION

Field of the Invention

The invention relates to an apparatus for conversion of an electric current with at least one phase module which has an AC voltage connection and at least one DC voltage connection, with a phase module branch being formed between each DC voltage connection and each AC voltage connection and with each phase module branch having a series circuit composed of submodules which each have an energy storage unit and at least one power semiconductor, having submodule sensors for detection of energy stored in the energy storage unit, with energy storage unit energy values being obtained, and having regulation means for regulation of the apparatus as a function of the energy storage unit energy values and predetermined nominal values.

The invention also relates to a method for conversion of a current by means of a converter which has at least one phase module with at least one DC voltage connection and an AC voltage connection, with a phase module branch being formed between each DC voltage connection and the AC voltage connection and having a series circuit composed of submodules which each have an energy storage unit and at least one power semiconductor.

An apparatus such as this and a method such as this are already known, for example, from the article by A. Lesnicar and R. Marquardt "An Innovative Modular Multilevel Converter Topology Suitable for a Wide Power Range", which appeared at Powertech 2003. This discloses a converter, which is intended for connection to an AC voltage network. The converter has a phase module for each phase of the AC voltage network to be connected to it, with each phase module having an AC voltage connection and two DC voltage connections. Phase module branches extend between each DC voltage connection and the AC voltage connection, thus providing a so-called six-pulse bridge circuit. The module branches comprise a series circuit of submodules which each comprise two power semiconductors which can be turned off and each have freewheeling diodes connected back-to-back in parallel with them. The power semiconductors which can be turned off and the freewheeling diodes are connected in series, with a capacitor being provided in parallel with said series circuit. Said components of the said modules are connected to one another such that either the capacitor voltage or the voltage zero is produced at the two-pole output of each submodule.

The power semiconductors which can be turned off are controlled by means of so-called pulse-width modulation. The regulation means for controlling the power semiconductors have measurement sensors for detection of currents, with current values being obtained. The current values are supplied to a central control unit which has an input interface and an output interface. A modulator, that is to say a software routine, is provided between the input interface and the output interface. Inter alia, the modulator has a selection unit and a pulse-width generator. The pulse-width generator produces the control signals for the individual submodules. The power semiconductors which can be turned off are switched by the control signals produced by the pulse-width generator from an on position, which allows current to flow via the power semiconductors which can be turned off, to an off position, in which a current flow via the power semiconductors which can be turned off is interrupted. In this case, each submodule has a submodule sensor for detection of a voltage dropped across the capacitor.

Further contributions to the control method for a so-called multi-level converter topology are known from R. Marquardt, A. Lesnicar, J. Hildinger, "Modulares Stromrichterkonzept für Netzkupplungsanwendung bei hohen Spannungen" [Modular converter concept for network coupling use at high voltages], which appeared at the ETG Symposium in Bad Nauenheim, Germany 2002, from A. Lesnicar, R. Marquardt, "A new modular voltage source inverter topology", EPE' 03 Toulouse, France 2003 and from R. Marquardt, A. Lesnicar "New Concept for High Voltage—Modular Multilevel Converter", PESC 2004 Conference in Aachen, Germany.

German patent application 10 2005 045 090.3, which has not yet been published, discloses a method for controlling a polyphase converter with distributed energy storage units. The disclosed apparatus likewise has a multi-level converter topology with phase modules which have an AC voltage connection, which is arranged symmetrically at the center of each phase module, and two DC voltage connections. Each phase module comprises two phase module branches which extend between the AC voltage connection and one of the DC voltage connections. Each phase module branch in turn comprises a series circuit of submodules, with each submodule comprising power semiconductors which can be turned off and freewheeling diodes connected back to back in parallel with them. Furthermore, each submodule has a unipolar capacitor. Regulation means are used to regulate the power semiconductors and are also designed to adjust branch currents which flow between the phase modules. The control of the branch currents makes it possible, for example, to actively damp current oscillations, and to avoid operating points with relatively low output frequencies. Furthermore, this makes it possible to achieve uniform loading on all the semiconductor switches which can be turned off, as well as balancing of highly unbalanced voltages.

The apparatus mentioned initially has the disadvantage that the real power consumption of a phase module branch does not always correspond precisely to the losses. This can result in an unbalanced distribution of the energy stored in each phase module branch. The capacitors in the submodules are therefore loaded to different levels, resulting in undesirable consequential phenomena.

BRIEF SUMMARY OF THE INVENTION

The object of the invention is therefore to provide an apparatus and a method of the type mentioned initially which avoid unbalanced loading of the energy storage units in the submodules.

The invention achieves this object on the basis of the apparatus mentioned initially in that the regulation means have an addition unit for addition of the energy storage unit energy values with branch energy actual values being obtained, and have means for calculation of circulating-current nominal values Dvb, Dhgl, Dhge as a function of the branch energy actual values, with the regulation means being designed to compensate for unbalances in the branch energy actual values as a function of the circulating-current nominal values Dvb, Dhgl, Dhge.

On the basis of the method mentioned initially, the invention achieves the object in that the energy which is stored in each energy storage unit is detected, with an energy storage unit energy value being obtained, all the energy storage unit energy values of a phase module branch are added in order to obtain branch energy actual values, and circulating-current nominal values are determined as a function of the branch energy actual, values, with circulating currents in the phase modules being produced as a function of the circulating-current nominal values in order to compensate for unbalances.

For the purposes of the invention, the regulation means are designed to compensate for unbalances relating to the electrical energy stored in the submodules. To this end, the energy stored in all the energy storage units is first of all determined for each phase module branch. This is done by addition of energy storage unit energy values which each correspond to an amount of energy stored in the energy storage unit of one submodule. The sum of the energy storage unit energy values results in branch energy actual values which correspond to a sum of the amounts of energy of all the energy storage units in one phase module branch. For the purposes of the invention, any unbalance is found by comparison of the branch energy actual values. Finally, a regulation system is used to produce circulating currents in order to compensate for the unbalance. The circulating-current nominal values Dvb, Dhgl, Dhge are used for this purpose, and are determined as a function of the difference between the branch energy actual values. The circulating-current nominal values are, finally, supplied to the regulation means, which produce the circulating currents required to compensate for the unbalances, on the basis of the circulating-current nominal values Dvb, Dhgl, Dhge. This ensures that there is a balanced load on the submodules.

By way of example, an energy storage unit voltage value which is obtained by measurement of the voltage dropped across the energy storage unit is used as the energy storage unit energy value of a submodule. In contrast to this, the square of the energy storage unit voltage value is used as the energy storage unit energy value. In principle, any value which can be used as a measure for the energy stored in the respective energy storage unit can be used for the purposes of the invention.

For the purposes of the invention, the energy storage unit in a submodule may also be composed of a plurality of sub-energy storage units. The energy storage unit energy value is then the sum of the sub-energy storage unit energy values.

The regulation means expediently comprise a regulator at whose input the circulating-current nominal values Dvb, Dhgl, Dhge are applied and at whose output circulating-voltage nominal values are tapped off. By way of example, the regulator is a proportional regulator. The regulation means furthermore comprise a current regulation unit, which linearly combines various voltage nominal values, including the circulating-voltage nominal values, with one another, that is to say combines them by addition and subtraction. The result of this linear combination of voltage nominal values is branch voltage nominal values which are each associated with one phase module branch. The branch voltage nominal value or values is or are supplied to drive units, which are likewise associated with one phase module branch.

The apparatus according to the invention advantageously has a positive and a negative DC voltage connection, with addition means adding the branch energy actual values of the phase module branches, which are connected to the positive DC voltage connection, to form a positive branch sum and adding the branch energy actual values of the phase module branches, which are connected to the negative DC voltage connection, to form a negative branch sum, and has subtraction means which form the difference between the positive and the negative branch sums in order to obtain a vertical circulating-current nominal value Dvb in order to compensate for any vertical unbalance. A vertical unbalance exists when the phase module branches which are connected to the positive DC voltage connection have taken up more or less energy than the phase module branches which are connected to the negative DC voltage connection.

Any vertical unbalance can therefore be found by comparison of the branch energy actual values, with the branch sum of the phase module branches which are connected to the positive DC voltage connection being subtracted from the branch sum of the phase module branches which are connected to the negative DC voltage connection. The resultant difference represents a measure of the vertical unbalance, thus, in this way, making it possible to derive a nominal value for the regulation in order to compensate for the vertical unbalance.

According to one expedient further development relating to this, the apparatus according to the invention has means for production of a network-frequency positive-phase-sequence system nominal voltage Uvb1, 2, 3 as a function of the vertical circulating-current nominal value Dvb, in order to compensate for the vertical unbalance. The network-frequency positive-phase-sequence system nominal voltage Uvb1, 2, 3 relates to the phase angle of the polyphase AC voltage of the connected network. In a network-frequency positive-phase-sequence system, the voltage which is produced rotates on the vector diagram in the same rotation direction as the vectors of the AC voltage of the connected network. As described above, the positive-phase-sequence system nominal voltage is applied to other voltage nominal values by the regulation means.

In contrast to this, means can be provided for production of an unbalance voltage Uasym as a function of the circulating-current nominal values Dvb in order to compensate for the vertical unbalance. Means such as this for producing an unbalance voltage are, for example, simple regulators to whose input the circulating-current nominal values are applied, with the unbalance voltage Uasym being produced at the output of the regulator. By way of example, the regulator is a simple proportional regulator.

Means are advantageously provided for verification of a horizontal unbalance in the same sense, with said means producing circulating-current nominal values Dhgl as a function of the verified horizontal unbalance in the same sense. In addition to a vertical unbalance, horizontal unbalances are also possible, to be precise when the branch energy actual values of the phase module branches which are connected to the positive DC voltage connection are of different magnitude. This applies in a corresponding manner to the branch energy actual values of the phase module branches which are connected to the negative DC voltage connection. A horizontal unbalance in the same sense occurs when the unbalance between the positive phase module branches is equal to the unbalance between the negative phase module branches. A horizontal unbalance in the opposite sense occurs, in contrast, when the unbalance between the positive phase module branches is the inverse of the unbalance between the negative phase module branches.

The apparatus according to the invention therefore advantageously has means for verification of a horizontal unbalance in the same sense, with said means producing circulating-current nominal values Dhg1 as a function of the verified horizontal unbalance in the same sense.

According to one expedient further development relating to this, means are provided for production of circulating-voltage nominal values uhgl, which are respectively associated with a phase module. The circulating-voltage nominal values uhgl are applied to other voltage nominal values by the regulation means.

Within the scope of the invention, means are advantageously provided for verification of a horizontal unbalance in the opposite sense, with said means producing circulating-current nominal values Dhge as a function of the verified horizontal unbalance in the opposite sense.

According to one expedient further development relating to this, means are provided for production of a network-frequency negative-phase-sequence voltage system uhge as a function of the verified horizontal unbalance in the opposite sense. The network-frequency negative-phase-sequence voltage system is distinguished by a voltage whose vector rotates in the opposite direction to the direction of the AC voltage network in the vector model.

According to another exemplary embodiment, means are provided for simultaneous compensation for vertical and horizontal unbalances in the opposite sense.

According to one expedient further development of the method according to the invention, the branch energy actual values of all the phase modules which are connected to a positive DC voltage connection are added in order to obtain a positive total sum, and the branch energy actual values of all the phase module branches which are connected to a negative DC voltage connection are added to obtain a negative total sum, with the difference between the positive and the negative total sum being formed in order to obtain a vertical circulating-current nominal value Dvb. This allows any vertical unbalance to be detected, and to be quantified with the aid of the circulating-current nominal value.

A network-frequency positive-phase-sequence system nominal voltage is advantageously produced on the basis of the vertical circulating-current nominal value. The amplitude of the DC nominal value in this case advantageously includes a periodic function.

In contrast to this an unbalance nominal voltage is produced on the basis of the vertical circulating-current nominal value Dvb, by means of a proportional regulator.

By way of example, any horizontal unbalance in the same sense is found by forming the branch energy actual values of all the phase module branches of a phase module in order to obtain phase module energy sum values, by forming the mean value of all the phase module energy sum values, and by forming differences from said mean value and each phase module energy sum value, obtaining horizontal unbalance-current nominal values in the same sense.

According to one expedient further development relating to this, circulating-voltage nominal values are formed by means of a regulator from the horizontal unbalance-current nominal values Dhgl in the same sense, and are applied as a nominal voltage by the regulation means to other voltage nominal values.

According to a further refinement of the invention, the branch energy actual values of all the phase module branches of a phase module are subtracted from one another in order to obtain phase module energy difference values which are associated with a respective phase. The mean value of the phase module energy difference values is then calculated over all the phases, and the difference from said mean value and the respective phase module energy difference value is determined for each phase, in order to obtain horizontal unbalance-current nominal values Dhge1, Dhge2, Dhge3 in the opposite sense.

According to one further development relating to this, a network-frequency negative-phase-sequence voltage system uhge1, uhge2, uhge3 is determined from the horizontal unbalance-current nominal values Dhge1, Dhge2, Dhge3 in the opposite sense.

The branch energy actual value of a phase module branch which is connected to a negative DC voltage connection is advantageously subtracted from the branch energy actual value of the phase module branch of the same phase module which is connected to the positive DC voltage connection, with a phase branch module difference being obtained, with the phase branch module difference being used as the amplitude of a periodic function which oscillates at the network frequency and is associated with a phase module, and with the periodic functions of the other phase modules each being phase-shifted so as to form a positive-phase-sequence system nominal voltage. The positive-phase-sequence system nominal voltage is once again applied to other nominal values of the regulation system.

BRIEF DESCRIPTION OF THE SEVERAL VIEWS OF THE DRAWING

Further expedient refinements and advantages are the subject matter of the following description of exemplary embodiments of the invention, with reference to the figures of the drawing, in which the same reference symbols refer to components having the same effect, and in which.

DESCRIPTION OF THE INVENTION

Figure 1:
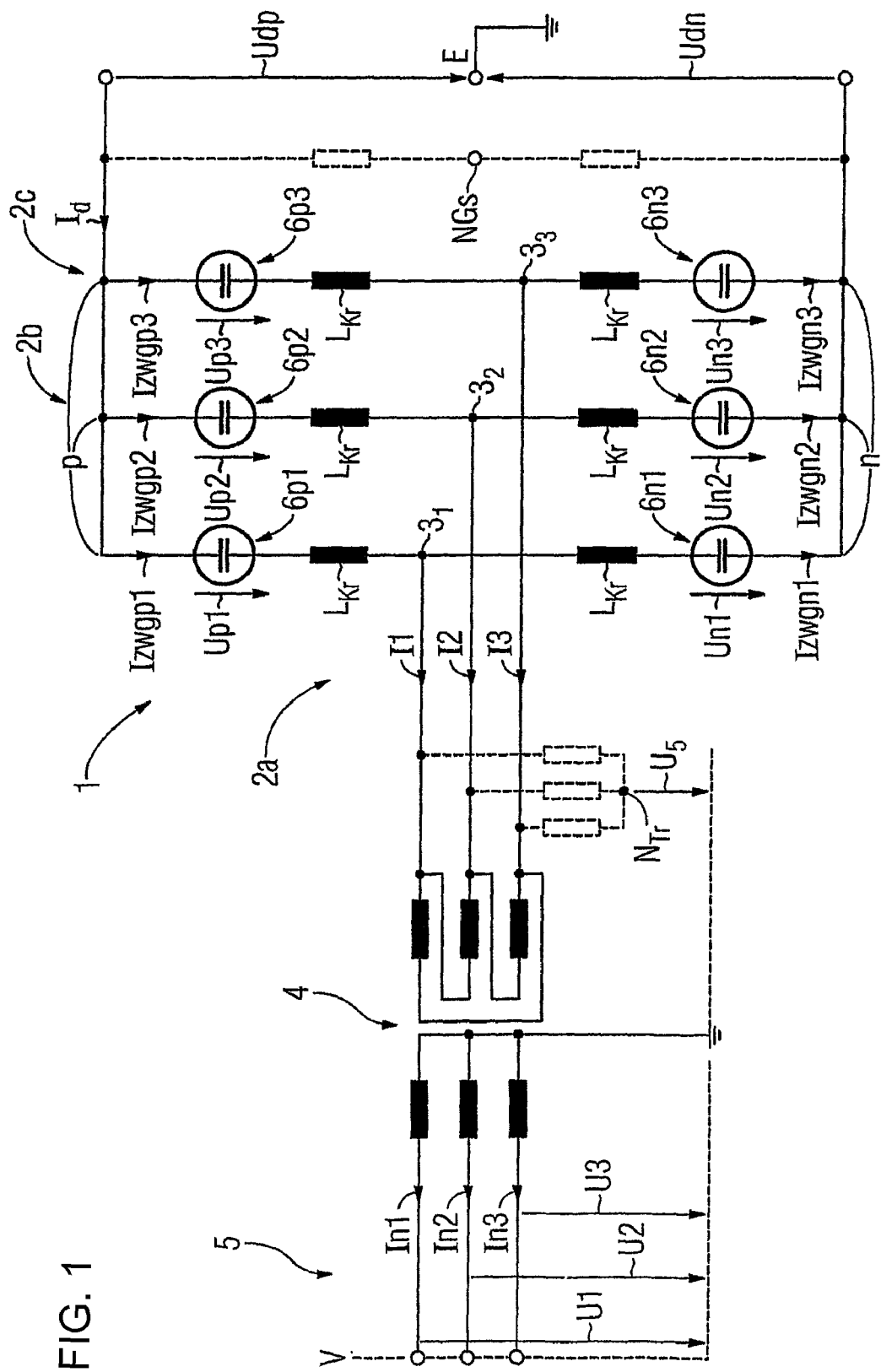
FIG. 1 shows a schematic illustration of one exemplary embodiment of an apparatus according to the invention.

FIG. 1 shows one exemplary embodiment of the apparatus 1 according to the invention, comprising three phase modules 2a, 2b and 2c. Each phase module 2a, 2b and 2c is connected to a positive DC voltage line p and to a negative DC voltage line n, as a result of which each phase module 2a, 2b, 2c has two DC voltage connections. Furthermore, a respective AC voltage connection $3_1$, $3_2$ and $3_3$ is provided for each phase module 2a, 2b and 2c. The AC voltage connections $3_1$, $3_2$ and $3_3$ are connected via a transformer 4 to a three-phase AC voltage network 5. The phase voltages between the phases of the AC voltage network 5 are U1, U2 and U3, with network currents In1, In2 and In3 flowing. The phase current on the AC voltage side of each phase module is annotated I1, I2 and I3. The direct current is $I_d$. The phase module branches 6p1, 6p2 and 6p3 extend between each of the AC voltage connections $3_1$, $3_2$ or $3_3$ and the positive DC voltage line p. The phase module branches 6n1, 6n2 and 6n3 are formed between each AC voltage connection $3_1$, $3_2$, $3_3$ and the negative DC voltage line n. Each phase module branch 6p1, 6p2, 6p3, 6n1, 6n2 and 6n3 comprises a series circuit formed by submodules, which are not illustrated in detail in FIG. 1, and an inductance, which is annotated $L_{kr}$ in FIG. 1.

Figure 2:
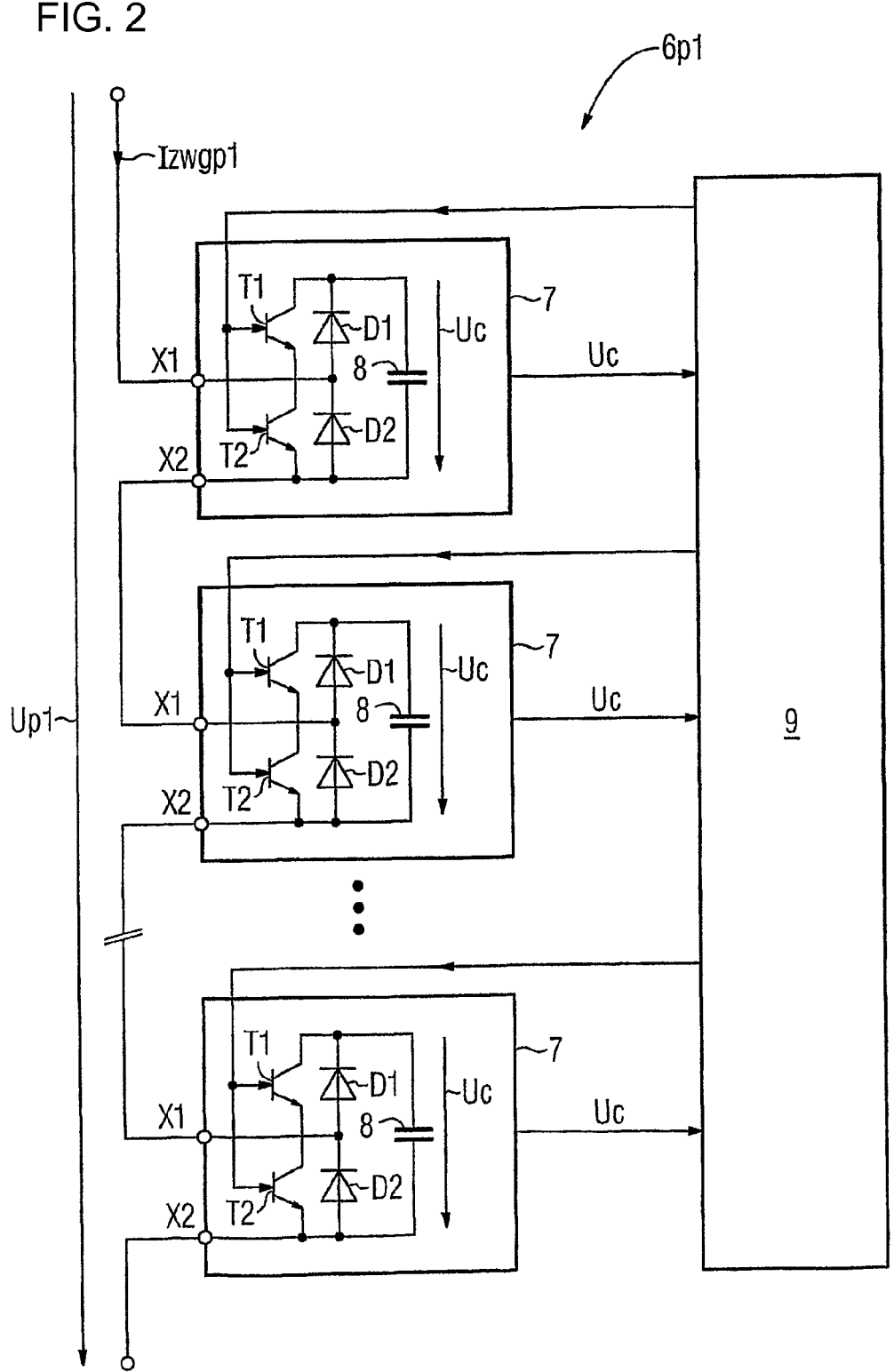
FIG. 2 shows an illustration of the equivalent circuit of a submodule of an apparatus as shown in FIG. 1.

FIG. 2 shows a more detailed illustration of the series circuit of the submodules 7 and, in particular, the formation of the submodules by means of an electrical equivalent circuit, with only the phase module branch 6p1 having been picked out in FIG. 2. However, the remaining phase module branches are of identical design. As can be seen, each submodule 7 has two series-connected power semiconductors T1 and T2 which can be turned off. By way of example, power semiconductors which can be turned off are so-called IGBTs, GTOs, IGCTs or the like. These are known per se to a person skilled in the art, and there is therefore no need to describe them in detail at this point. A freewheeling diode D1, D2 is connected back-to-back in parallel with each power semiconductor T1, T2 which can be turned off. A capacitor 8 is connected as an energy storage unit in parallel with the series circuit of the power semiconductors T1, T2 which can be turned off and the respective freewheeling diodes D1 and D2. Each capacitor 8 is charged on a unipolar basis. Two voltage states can now be produced at the two-pole connecting terminals X1 and X2 of each submodule 7. If, for example, a drive unit 9 produces a drive signal which switches the power semiconductor T2 which can be turned off to its switched-on position, in which a current can flow via the power semiconductor T2, as a voltage of zero between the terminals X1, X2 of the submodule 7. In this case, the power semiconductor T1 which can be turned off is in its switched-off position, in which any current flow via the power semiconductor T1 which can be turned off is interrupted. This prevents discharging of the capacitor 8. If, in contrast, the power semiconductor T1 which can be turned off is in its switched-on position, but the power semiconductor T2 which can be turned off is changed to its switched-off position, the full capacitor voltage Uc is present between the terminals X1, X2 of the submodule 7.

The exemplary embodiment of the apparatus according to the invention as shown in FIGS. 1 and 2 is also referred to as a so-called multi-level converter. A multilevel converter such as this is suitable, for example, for driving electrical machines, such as motors or the like. Furthermore, a multi-level converter such as this is also suitable for use in the field of power distribution and transmission. By way of example, the apparatus according to the invention is used as a back-to-back link which comprises two converters connected to one another on the DC voltage side, with each of the converters being connected to an AC voltage network. Back-to-back links such as these are used to exchange energy between two power distribution networks, for example with the power distribution networks having a different frequency, phase angle, star-point connection or the like. Furthermore, applications may be considered in the field of power factor correction, as so-called FACTS (flexible AC transmission systems). High-voltage direct-current transmission over long distances is also feasible using multi-level converters such as these.

In order to avoid unbalanced distribution of the energy between the submodules 7, that is to say between the capacitors 8 of the submodules 7, the first action within the scope of the invention is to determine whether any unbalances are present.

Figure 3:
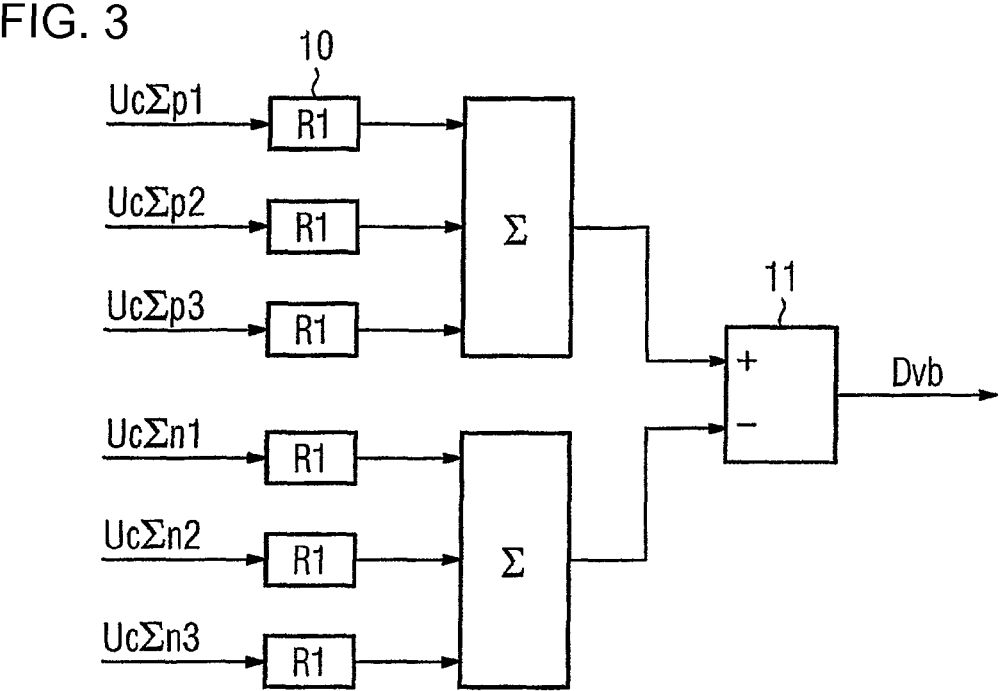
FIG. 3 shows a method for finding any vertical unbalance.

FIG. 3 schematically illustrates a method for detection of any vertical unbalance. For this purpose, the branch energy actual values $Uc\Sigma p1, \ldots, Uc\Sigma n3$ are first of all determined for each phase module branch $6p1, \ldots, 6n3$. This is done by measuring the voltage Uc across the capacitor 8 for each submodule 7. As is shown by the arrow pointing to the right in FIG. 2, the capacitor voltage value Uc detected by the voltage sensor is transmitted to the evaluation unit 9. The evaluation unit 9 adds all the capacitor voltage values Uc of a phase module branch $6p1, \ldots, 6n3$ to form branch energy actual values $Uc\Sigma p1, \ldots, Uc\Sigma n3$. In this case, it is irrelevant whether the submodule is connected to the series circuit and is or is not making any contribution. In order to obtain a measure for the stored energy, it is also possible to square the voltage Uc across the capacitors to form $Uc^2$, and then to add $Uc^2$ to form the branch energy actual values.

In this case, the branch energy actual values therefore correspond to branch voltage actual values $Uc\Sigma p1, \ldots, Uc\Sigma n3$. These are each converted by a proportional regulator 10 to form intermediate values, and the intermediate values of the phase module branches 6p1, 6p2, 6p3 which are connected to the positive DC voltage connection p are added to one another. A corresponding procedure is adopted for the intermediate values of the phase module branches 6n1, 6n2, 6n3 which are connected to the negative DC voltage connection n. This results in a positive branch sum and a negative branch sum, which are subtracted from one another by means of the subtractor 11, thus forming the circulating-current nominal value Dvb in order to compensate for any vertical unbalance.

Figure 4:
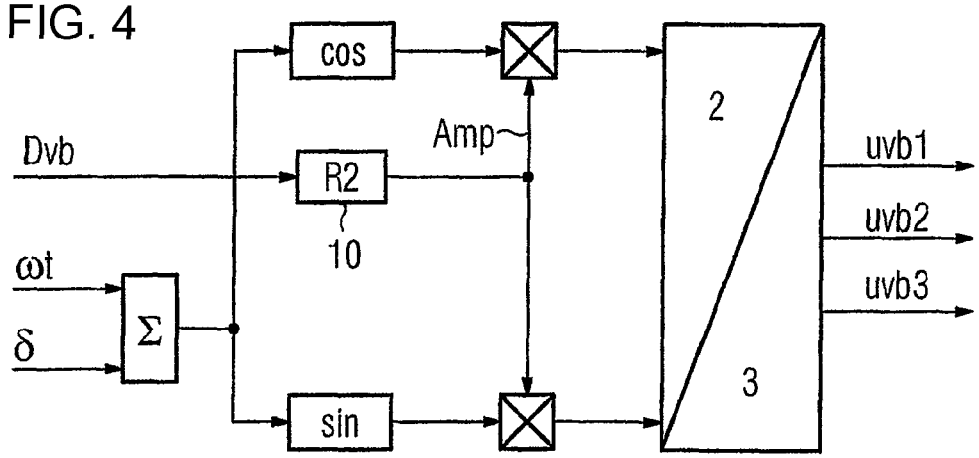
FIG. 4 shows the production of a network-frequency positive-phase-sequence system voltage.

FIG. 4 illustrates the production of a network-frequency positive-phase-sequence system nominal voltage. First of all, both a sine function and a cosine function are formed with the argument ωt and the addition of a phase shift δ. In this case, ω corresponds to the frequency of the voltage of the connected network. The cosine function and the sine function are each multiplied by an amplitude which is formed from the circulating-current nominal value Dvb, using a proportional regulator 10. The subsequent conversion of the two-dimensional vector space to the three-dimensional space results in the network-frequency positive-phase-sequence system nominal voltage uvb1, uvb2 and uvb3. These are applied to other nominal voltages in a current regulation unit.

Figure 5:
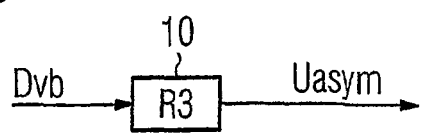
FIG. 5 shows the production of an unbalance voltage.

On the basis of the circulating-current nominal value Dvb formed as shown in FIG. 3, it is also possible to produce an unbalance voltage Uasyn instead of producing a network-frequency positive-phase-sequence system nominal voltage. For this purpose, as is shown in FIG. 5, the circulating-current nominal value Dvb is applied to the input of a regulator 10 which, for example, is a proportional regulator. The unbalance voltage Uasyn can be tapped off at the output of the regulator 10.

Figure 6:
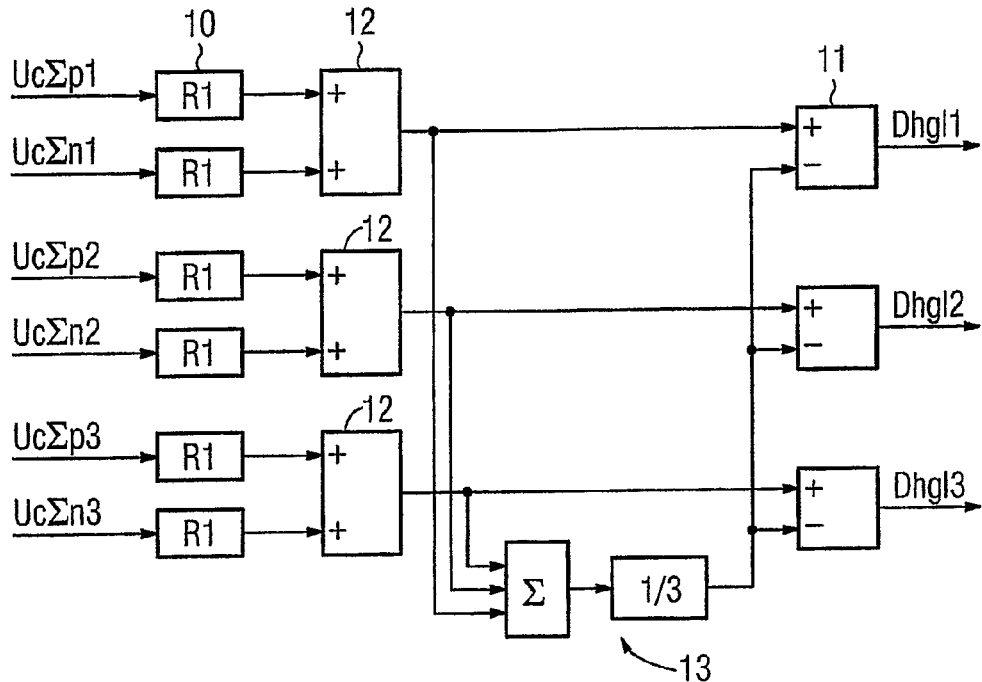
FIG. 6 shows the verification of any horizontal unbalance in the same sense.

FIG. 6 illustrates the verification of a horizontal unbalance in the same sense. For this purpose, the branch energy actual values $Uc\Sigma p1, \ldots, Uc\Sigma n3$ of the phase module branches $6p1, \ldots, 6n3$ of the same phase module 2a, 2b, 2c are each added to form phase module energy sum values, with the branch energy actual values previously having been amplified by the regulator 10 in proportion to intermediate values. An adder 12 is used for addition. The averager 13 forms the mean value of the phase module energy sum values at the output of the adder 12, and the subtractor 11 subtracts this from each phase module energy sum value of one phase. Vertical circulating-current nominal values Dhgl1, Dhgl2, Dhgl3 for each phase can be tapped off at the output of each subtractor 11.

Figure 7:
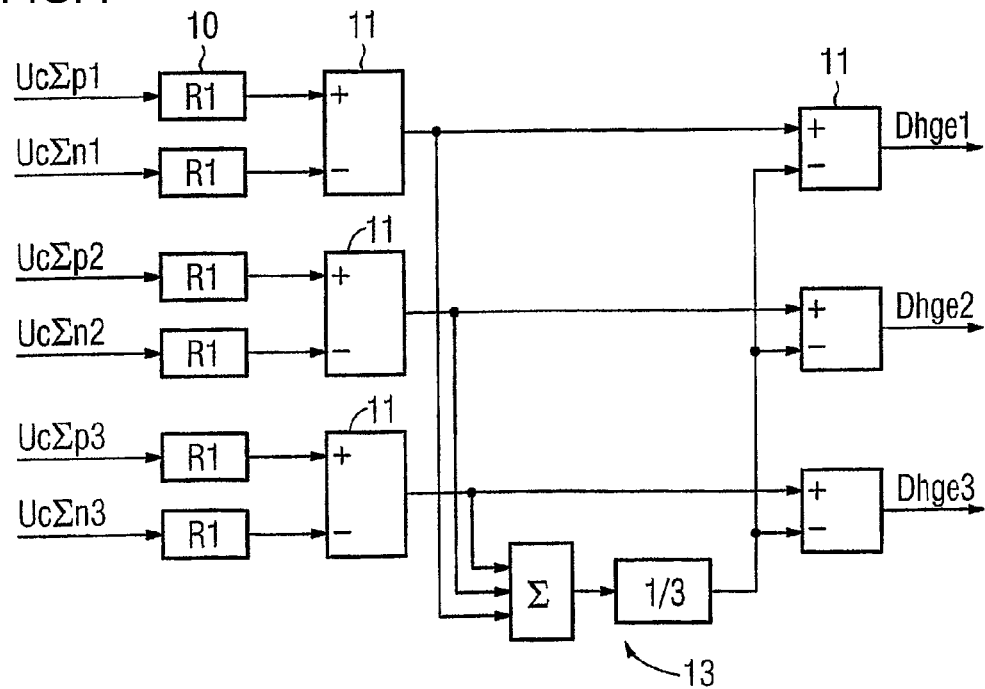
FIG. 7 shows the verification of any vertical unbalance in the opposite sense.

FIG. 7 illustrates how a horizontal unbalance in the opposite sense can be verified. For this purpose, the branch energy actual values $Uc\Sigma p1, \ldots, Uc\Sigma n3$ are once again first of all amplified by a regulator 10. In contrast to the method shown in FIG. 6, the difference between the branch energy actual values $Uc\Sigma p1, \ldots, Uc\Sigma n1$ of the phase module branches of the same phase module 2a, 2b, 2c is then calculated. The mean value is once again formed from the difference over all three phases, with the mean value being subtracted from said difference. Finally, the horizontal unbalance-current nominal value Dhge1, Dhge2 and Dhge3 in the opposite sense for each phase can be tapped off at the output of the second subtractor 11.

Figure 8:
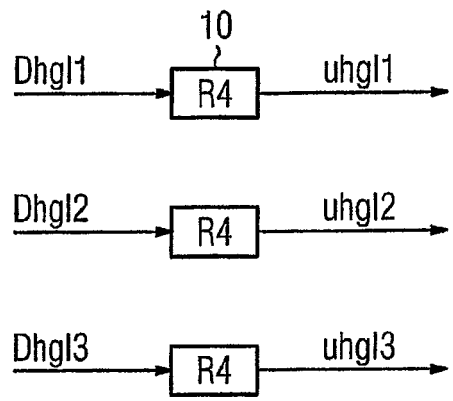
FIG. 8 shows a method for production of unbalance voltages.

FIG. 8 illustrates how a proportional regulator 10 produces circulating-voltage nominal values uhgl1, uhgl2 and uhgl3 from the circulating-current nominal values Dghl1, Dghl2, Dghl3. As already described, these circulating-voltage nominal values are fed into the regulation system, thus setting the desired circulating currents to compensate for the balances.

Figure 9:
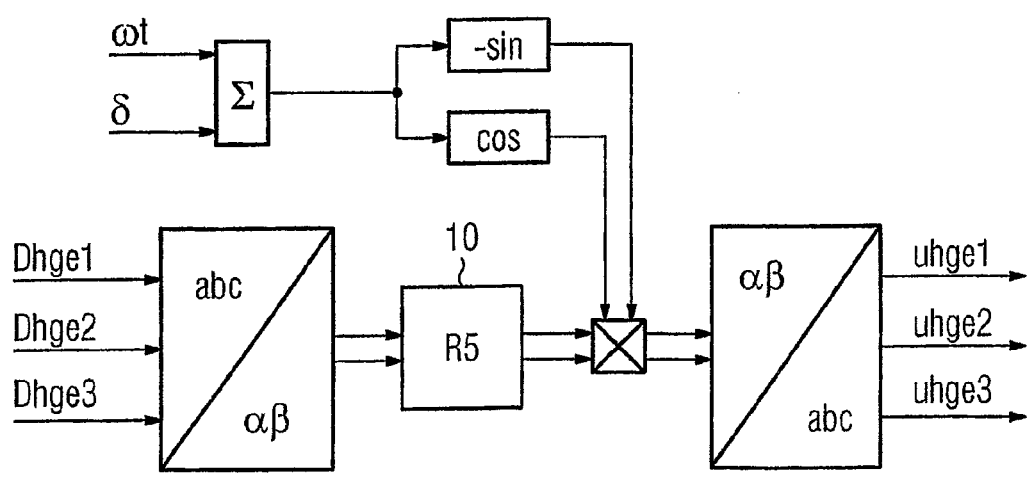
FIG. 9 shows a method for production of a network-frequency negative-phase-sequence system voltage.

FIG. 9 shows the production of a network-frequency negative-phase-sequence system voltage uhge1, uhge2 and uhge3. This is done starting from the horizontal unbalance-current nominal values in the opposite sense Dhge1, Dhge2 and Dhge3. Said unbalance-current nominal values are first of all transformed in the two-dimensional vector space, and are then amplified proportionally by a regulator 10. The amplified unbalance nominal values are used as the amplitude of a cosine function and of a negative sine function with the argument ωt and the phase shift δ. After transformation to the three-dimensional space, the network-frequency negative-phase-sequence system nominal voltage uhge1, uhge2, uhge3 is obtained for feeding into the current regulation unit and for application to further nominal values in the regulation system.

Figure 10:
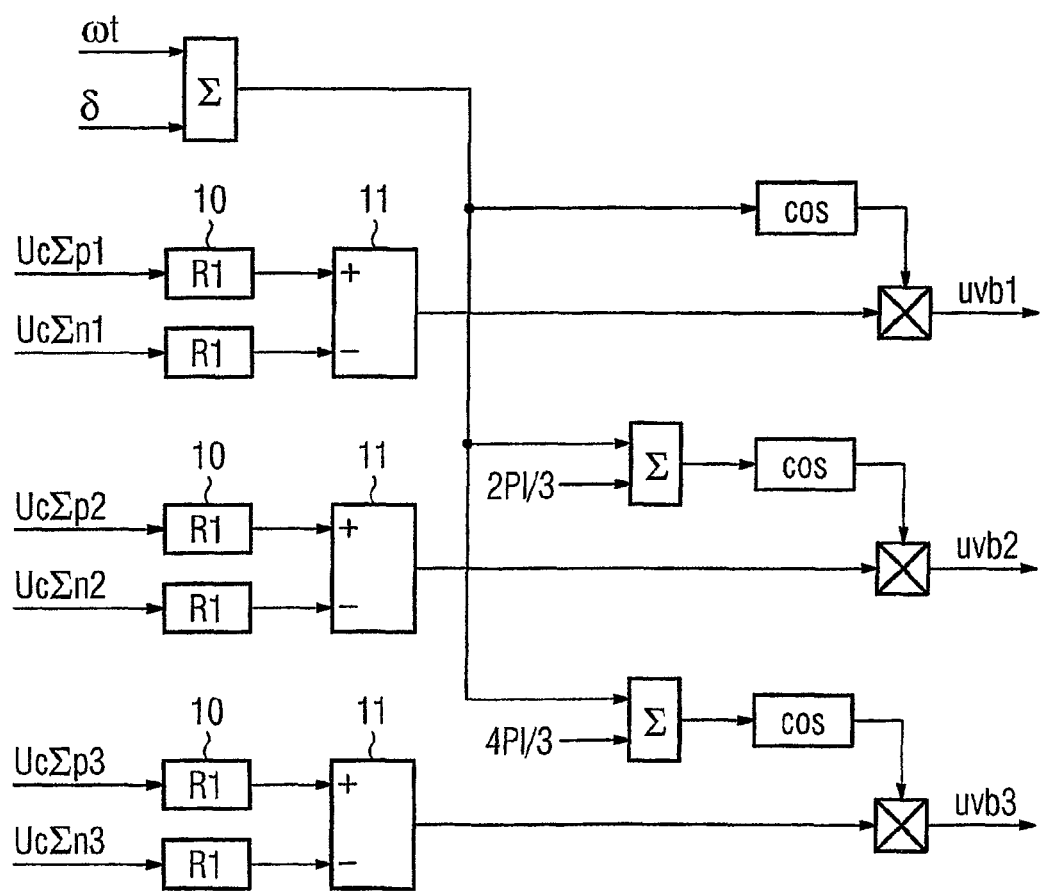
FIG. 10 shows means for simultaneous compensation for vertical and horizontal unbalances in the opposite sense.

FIG. 10 illustrates means for simultaneous compensation for vertical unbalances and horizontal unbalances in the opposite sense. As described in conjunction with FIG. 7, branch energy actual values UcΣp1, ..., UcΣn3 of the phase module branches 6p1, ..., 6n3 of a common phase module are first of all amplified proportionally by a regulator 10, and the difference is then formed in the subtractor 11. Cosine functions which depend on the network frequency ω and on the phase δ are formed in parallel with this. The cosine functions, which are formed phase-by-phase, are phase-shifted through $$\frac{2\pi}{3}$$

with respect to one another. The phase-shifted cosine functions are multiplied by the phase branch module difference that results at the output of the subtractor 11, as an amplitude, thus resulting in a positive-phase-sequence system nominal voltage uvb1, uvb2 and Uvb3.

Figure 11:
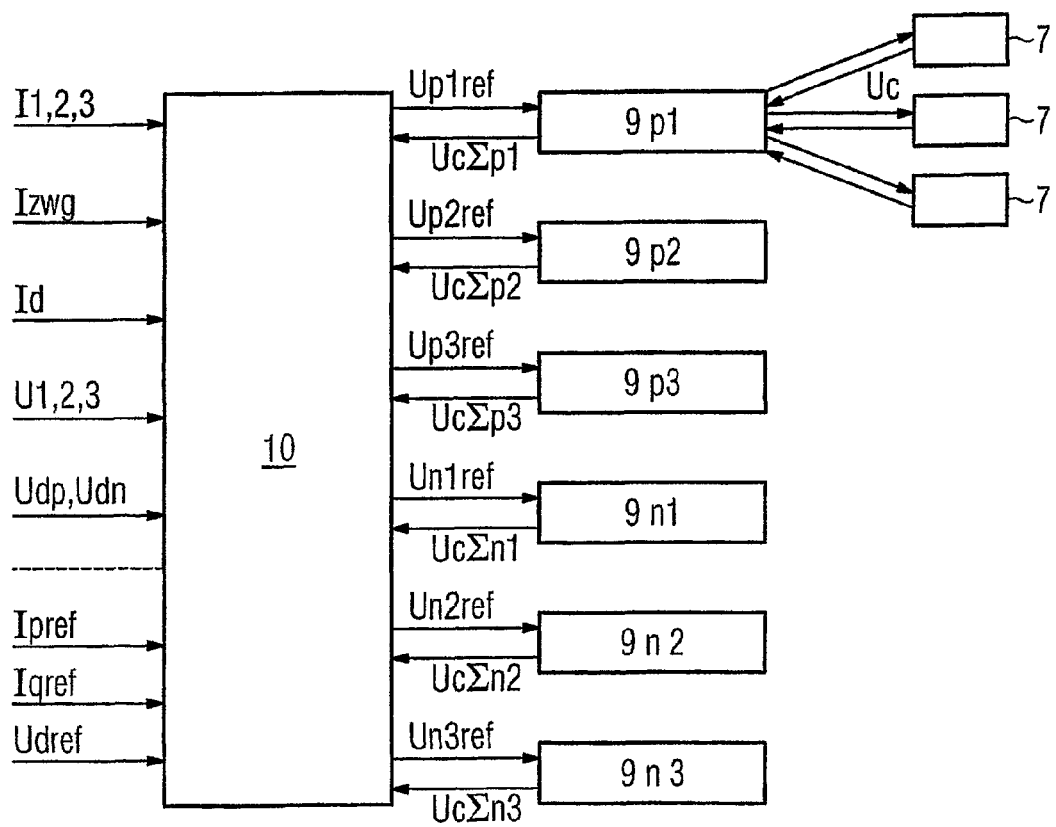
FIG. 11 shows the structure of the regulation means of the apparatus shown in FIG. 1.

FIG. 11 illustrates the structure of the regulation means. The regulation means comprise a current regulation unit 10 and drive units 9p1, 9p2, 9p3, and 9n1, 9n2 and 9n3. Each of the drive units is associated with a respective phase module branch 6p1, 6p2, 6p3, 6n1, 6n2 and 6n3. The drive unit 9p1, for example, is connected to each submodule 7 of the phase module branch 6p1 and produces the control signals for the power semiconductors T1, T2 which can be turned off. A submodule voltage sensor, which is not illustrated in the figures, is provided in each submodule 7. The submodule voltage sensor is used to detect the capacitor voltage across the capacitor 8, as the energy storage unit of the submodule 7, with a capacitor voltage value Uc being obtained. The capacitor voltage value Uc is made available to the respective drive unit, in this case 9p1. The drive unit 9p1 therefore obtains the capacitor voltage values of all the submodules 7 of the phase module branch 6p1 associated with it, and adds these to obtain a branch energy actual value or in this case branch voltage actual value UcΣp1, which is likewise associated with the phase module branch 6p1. This branch voltage actual value UcΣp1 is supplied to the current regulation unit 10.

Apart from this, the current regulation unit 10 is connected to various measurement sensors, which are not illustrated in the figures. For example, current transformers arranged on the AC voltage side of the phase modules 2a, 2b, 2c are used to produce and supply phase current measured values I1, I2, I3, and current transformers arranged on each phase module are used to produce and supply phase module branch currents Izwg, and a current transformer which is arranged in the DC voltage circuit of the converter is used to provide DC measured values Id. Voltage converters in the AC network provide network voltage measured values U1, U2, U3 and DC voltage converters provide positive DC voltage measured values Udp and negative DC voltage measured values Udn, with the positive DC voltage values Udp corresponding to a DC voltage between the positive DC voltage connection p and ground, and with the negative DC voltage values Udn correspond to a voltage between the negative DC voltage connection and ground.

Furthermore, nominal values are supplied to the current regulation unit 10. In the exemplary embodiment shown in FIG. 11, an in-phase current nominal value Ipref and a reactive current nominal value Iqref are supplied to the regulation unit 10. Furthermore, a DC voltage nominal value Udref is applied to the input of the current regulation unit 10. It is also possible to use a DC nominal value Idref for the purposes of the invention, instead of a DC voltage nominal value Udref.

The nominal values Ipref, Iqref and Udref as well as said measured values interact with one another using various regulators, with a branch voltage nominal value Up1ref, Up2ref, Up3ref, Un1ref, Un2ref, Un3ref being produced for each drive unit 9p1, 9p2, 9p3, 9n1, 9n2 and 9n3. Each drive unit 9 produces control signals for the submodules 7 associated with it, as a result of which the voltage Up1, Up2, Up3, Un1, Un2 and Un3 across the series circuit of the submodules corresponds as far as possible to the respective branch voltage nominal value Up1ref, Up2ref, Up3ref, Un1ref, Un2ref, Un3ref.

The current regulation unit 10 uses its input values to form suitable branch voltage nominal values Up1ref, Up2ref, Up3ref, Un1ref, Un2ref, Un3ref.

Figure 12:
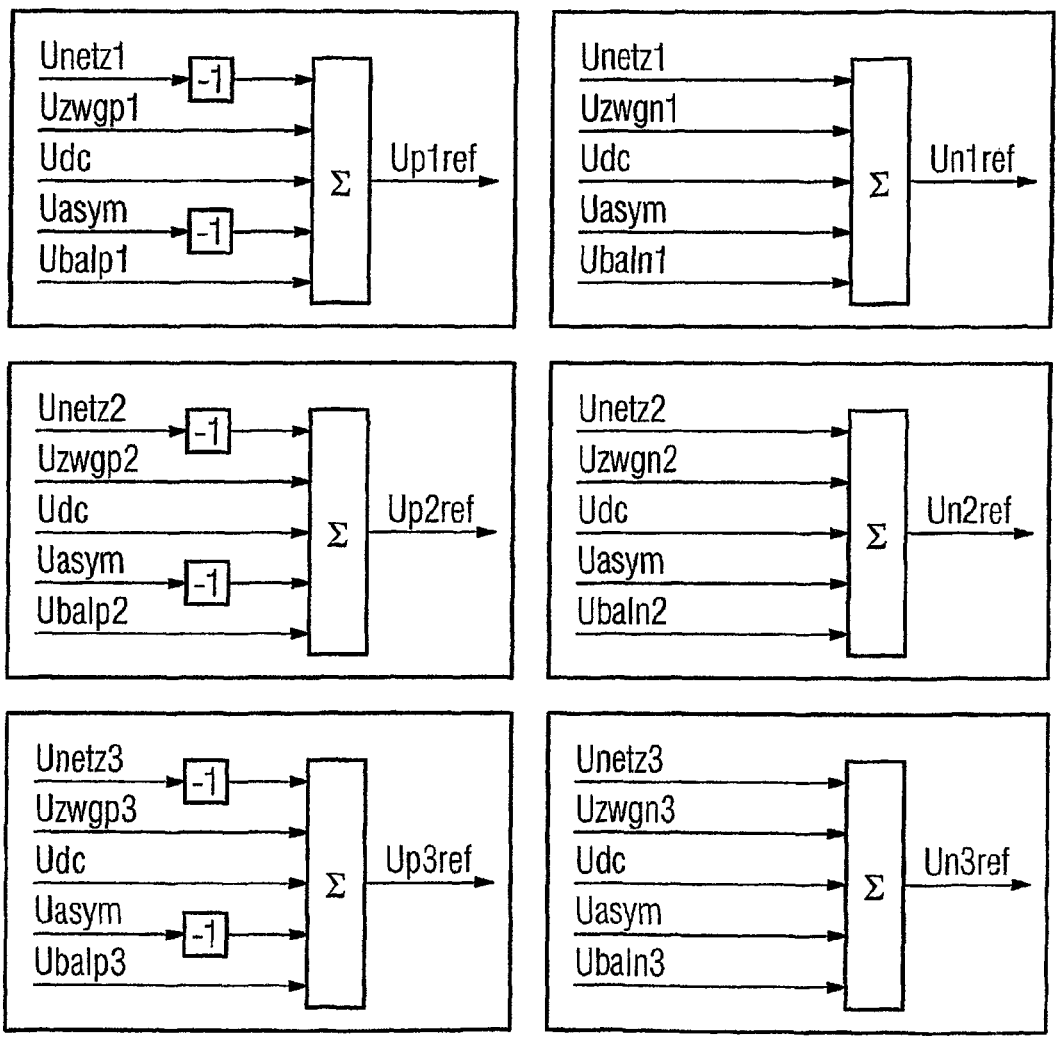
FIG. 12 shows the application of circulating-voltage nominal values to other nominal values of the regulation means.

FIG. 12 shows that, for example, the branch voltage nominal value Upref is calculated by linear combination of a network phase voltage nominal value Unetz1, a branch voltage intermediate nominal value Uzwgp1, a DC voltage nominal value Udc, a balance voltage nominal value Uasym and a balancing voltage nominal value Ubalp1. This is done mutually independently for each of the phase module branches 6p1, 6p2, 6p3, 6n1, 6n2, 6n3. The circulating currents can be set specifically by the branch voltage intermediate nominal values Uzwg in conjunction with the branch inductance settings. The balancing voltage nominal values Uba1 are also used to compensate for unbalances with regard to the amounts of energy stored in the phase module branches 6p1, 6p2, 6p3, 6n1, 6n2 and 6n3.

The invention claimed is:

1. An apparatus for conversion of an electric current, comprising:
   at least one DC voltage connection;
   at least one phase module having an AC voltage connection and a phase module branch formed between each said DC voltage connection and each said AC voltage connection, each said phase module branch having a series circuit composed of submodules each having an energy storage unit, at least one power semiconductor, and submodule sensors for detecting energy stored in said energy storage unit and obtaining energy storage unit energy values; and a regulation device for regulation of the apparatus in dependence on the energy storage unit energy values and predetermined nominal values, said regulation device having an addition unit for addition of the energy storage unit energy values resulting in branch energy actual values being obtained and means for calculation of circulating-current nominal values in dependence on the branch energy actual values, said regulation device compensating for unbalances in the branch energy actual values in dependence on the circulating-current nominal values.

2. The apparatus according to claim 1,
wherein said at least one DC voltage connection includes a positive voltage connection and a negative DC voltage connection;
further comprising addition means for adding the branch energy actual values of said phase module branches, which are connected to said positive DC voltage connection, to form a positive branch sum and adding the branch energy actual values of said phase module branches, which are connected to said negative DC voltage connection, to form a negative branch sum; and
further comprising subtraction means forming a difference between the positive branch sum and the negative branch sum to obtain a vertical circulating-current nominal value to compensate for any vertical unbalance.

3. The apparatus according to claim 2, further comprising means for producing a network-frequency positive-phase-sequence system nominal voltage in dependence on the vertical circulating nominal current to compensate for the vertical unbalance.

4. The apparatus according to claim 2, further comprising means for producing an unbalance voltage in dependence on the circulating-current nominal values to compensate for the vertical unbalance.

5. The apparatus according to claim 1, further comprising means for verification of a commonly directed horizontal unbalance outputting a verified commonly directed horizontal unbalance, with said means producing the circulating-current nominal values in dependence on the verified commonly directed horizontal unbalance.

6. The apparatus according to claim 5, further comprising means for producing circulating-voltage nominal values which are respectively associated with said phase module.

7. The apparatus according to claim 1, further comprising means for verification of an oppositely directed horizontal unbalance and outputting a verified oppositely directed horizontal unbalance, with said means producing the circulating-current nominal values in dependence on the verified oppositely directed horizontal unbalance.

8. The apparatus according to claim 7, further comprising means for producing a network-frequency negative-phase-sequence system circulating voltage in dependence on the circulating-current nominal values.

9. The apparatus according to claim 1, further comprising means for simultaneous compensation for oppositely directed vertical and horizontal unbalances.

10. A method for conversion of a current by means of a converter having at least one DC voltage connection, an AC voltage connection and phase modules each with a phase module branch being formed between the DC voltage connection and the AC voltage connection, the phase module branch having a series circuit composed of submodules each having an energy storage unit and at least one power semiconductor, which comprises the steps of:

detecting an amount of energy stored in each of the energy storage units resulting in energy storage unit energy values being obtained;
adding all of the energy storage unit energy values of the phase module branch resulting in branch energy actual values;
determining circulating-current nominal values from the branch energy actual values; and
producing circulating currents in the phase modules in dependence on the circulating-current nominal values in order to compensate for unbalances.

11. The method according to claim 10, which further comprises:
adding the branch energy actual values of all the phase modules which are connected to a positive DC voltage connection for obtaining a positive total sum;
adding the branch energy actual values of all the phase module branches which are connected to a negative DC voltage connection for obtaining a negative total sum; and
determining a difference between the positive and the negative total sums for obtaining a vertical circulating-current nominal value.

12. The method according to claim 11, which further comprises producing a network-frequency positive-phase-sequence system nominal voltage on a basis of the vertical circulating-current nominal value.

13. The method according to claim 11, which further comprises producing an unbalance nominal voltage on a basis of the vertical circulating-current nominal value by means of a proportional regulator.

14. The method according to claim 10, which further comprises
adding the branch energy actual values of all the phase module branches of a phase module for obtaining phase module energy sum values which are associated with a respective phase;
calculating a mean value of the phase module energy sum values over all the phases; and
calculating a difference from the mean value and the respective phase module energy sum value for each phase, for obtaining commonly directed horizontal unbalance-current nominal values.

15. The method according to claim 14, which further comprises forming circulating-voltage nominal values by means of regulators from the commonly directed horizontal unbalance-current nominal values, and are included as a nominal voltage in a regulation process.

16. The apparatus according to claim 10, which further comprises:
subtracting the branch energy actual values of all the phase module branches of the phase module from one another for obtaining phase module energy difference values which are associated with a respective phase;
calculating a mean value of the phase module energy difference values over all the phases; and
calculating a difference from the mean value and the respective phase module energy difference value for each phase for obtaining oppositely directed horizontal unbalance-current nominal values.

17. The method according to claim 16, which further comprises producing a network-frequency negative-phase-sequence voltage system from the oppositely directed horizontal unbalance-current nominal values.

18. The method according to claim 10, which further comprises:
  subtracting the branch energy actual value of a phase module branch which is connected to a negative DC voltage connection from the branch energy actual value of the phase module branch of a same phase module which is connected to the positive DC voltage connection, with a phase branch module difference being obtained; and using the phase branch module difference as an amplitude of a periodic function which oscillates at a network frequency and is associated with a phase module, and with periodic functions of the other phase modules each being phase-shifted so as to form a positive-phase-sequence system nominal voltage.

* * * * *